US012686237B2

(12) United States Patent
Vennebörger et al.

(10) Patent No.: US 12,686,237 B2
(45) Date of Patent: Jul. 21, 2026

(54) PNEUMATIC VEHICLE TYRE

(71) Applicant: Continental Reifen Deutschland GmbH, Hannover (DE)

(72) Inventors: Martin Vennebörger, Hannover (DE); Artur Fuchs, Hannover (DE); Torsten Heinhaupt, Celle (DE); Ulrich Behr, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 18/852,525

(22) PCT Filed: Feb. 10, 2023

(86) PCT No.: PCT/DE2023/200030
§ 371 (c)(1),
(2) Date: Sep. 30, 2024

(87) PCT Pub. No.: WO2023/186221
PCT Pub. Date: Oct. 5, 2023

(65) Prior Publication Data
US 2025/0214379 A1    Jul. 3, 2025

(30) Foreign Application Priority Data

Apr. 1, 2022    (DE) ..................... 10 2022 203 296.9

(51) Int. Cl.
*B60C 11/24*    (2006.01)
*B60C 11/03*    (2006.01)
*B60C 11/12*    (2006.01)

(52) U.S. Cl.
CPC .......... *B60C 11/24* (2013.01); *B60C 11/0304* (2013.01); *B60C 11/1218* (2013.01); *B60C 11/0302* (2013.01)

(58) Field of Classification Search
CPC . B60C 11/12; B60C 11/1204; B60C 11/1236; B60C 2011/1227;
(Continued)

(56) References Cited

U.S. PATENT DOCUMENTS

2012/0103484 A1    5/2012    Ohashi
2024/0383284 A1*    11/2024    Matsumoto ......... B60C 11/1236

FOREIGN PATENT DOCUMENTS

CN    204586376 U    8/2015
DE    102011050911 A1    12/2012
(Continued)

OTHER PUBLICATIONS

International Search Report and Written Opinion dated May 17, 2023 of International Application PCT/DE2023/200030 on which this application is based on.

*Primary Examiner* — Cedrick S Williams
(74) *Attorney, Agent, or Firm* — Richard A. Wolf; Gregory Adams

(57) ABSTRACT

The invention relates to a pneumatic vehicle tire comprising a tread with profile positives delimited by grooves, including profile positives which are provided with sipes, which in plan view run at least in certain portions at an angle of 0° to 50° to the axial direction and have a width of 0.4 mm to 1.6 mm and a depth at the deepest point that is at least the profile depth reduced by 4.5 mm and at most 100% of the profile depth, with the sipes in each case being involved in forming at least one wear indicator. The wear indicator is formed by a sipe portion of the sipe which in plan view has the form of a sun symbol or a snowflake symbol.

5 Claims, 4 Drawing Sheets

(58) Field of Classification Search
CPC ......... B60C 2011/1218; B60C 2011/03; B60C
2011/0304; B60C 2011/24
See application file for complete search history.

(56) References Cited

FOREIGN PATENT DOCUMENTS

| DE | 102011054662 A1 | 4/2013 | |
|----|------|------|------|
| DE | 102013111197 A1 | 4/2015 | |
| EP | 2329967 A1 | 6/2011 | |
| EP | 2455236 A1 | 5/2012 | |
| EP | 2329967 B2 | 3/2017 | |
| EP | 2861433 B1 | 6/2019 | |
| JP | 1293205 A | * 11/1989 | ............. B60C 11/12 |

* cited by examiner

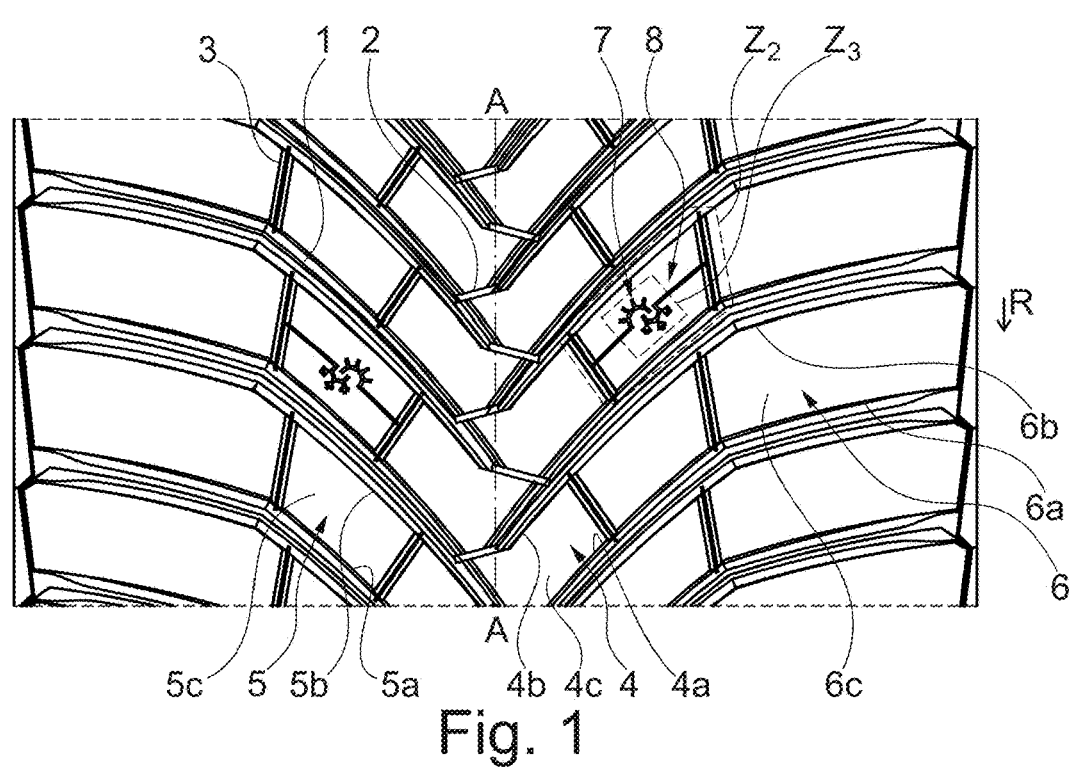
Fig. 1
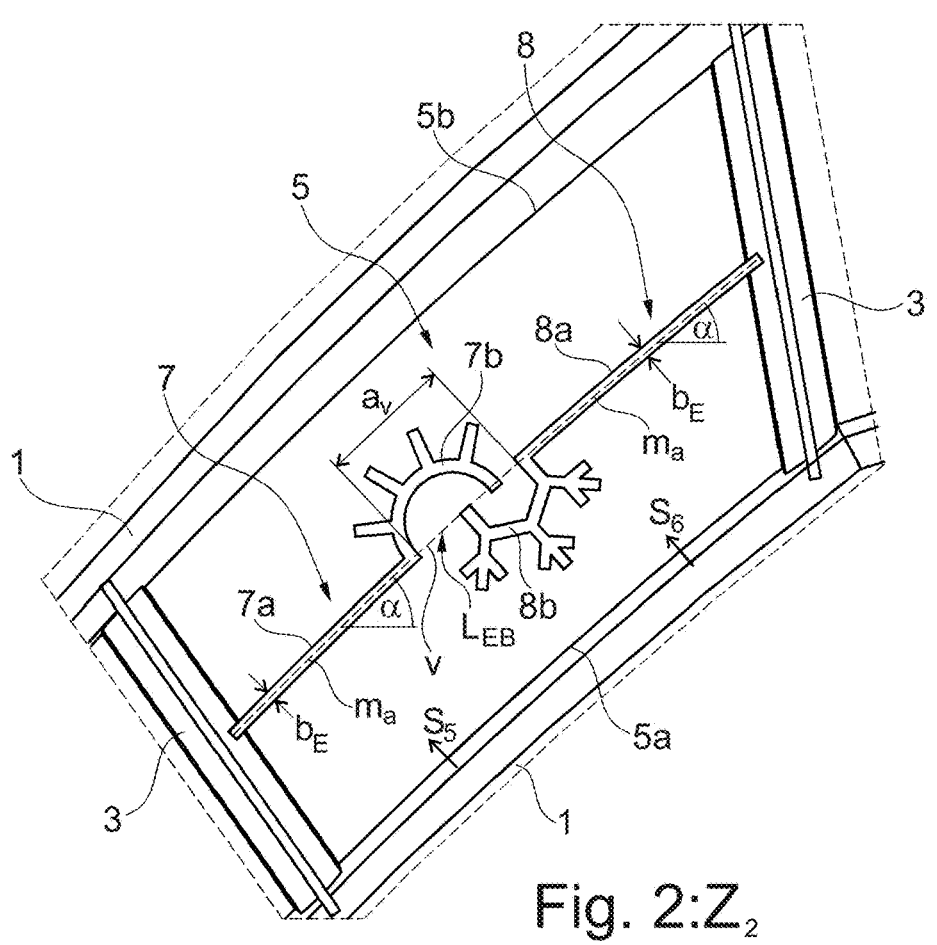
Fig. 2:Z$_2$

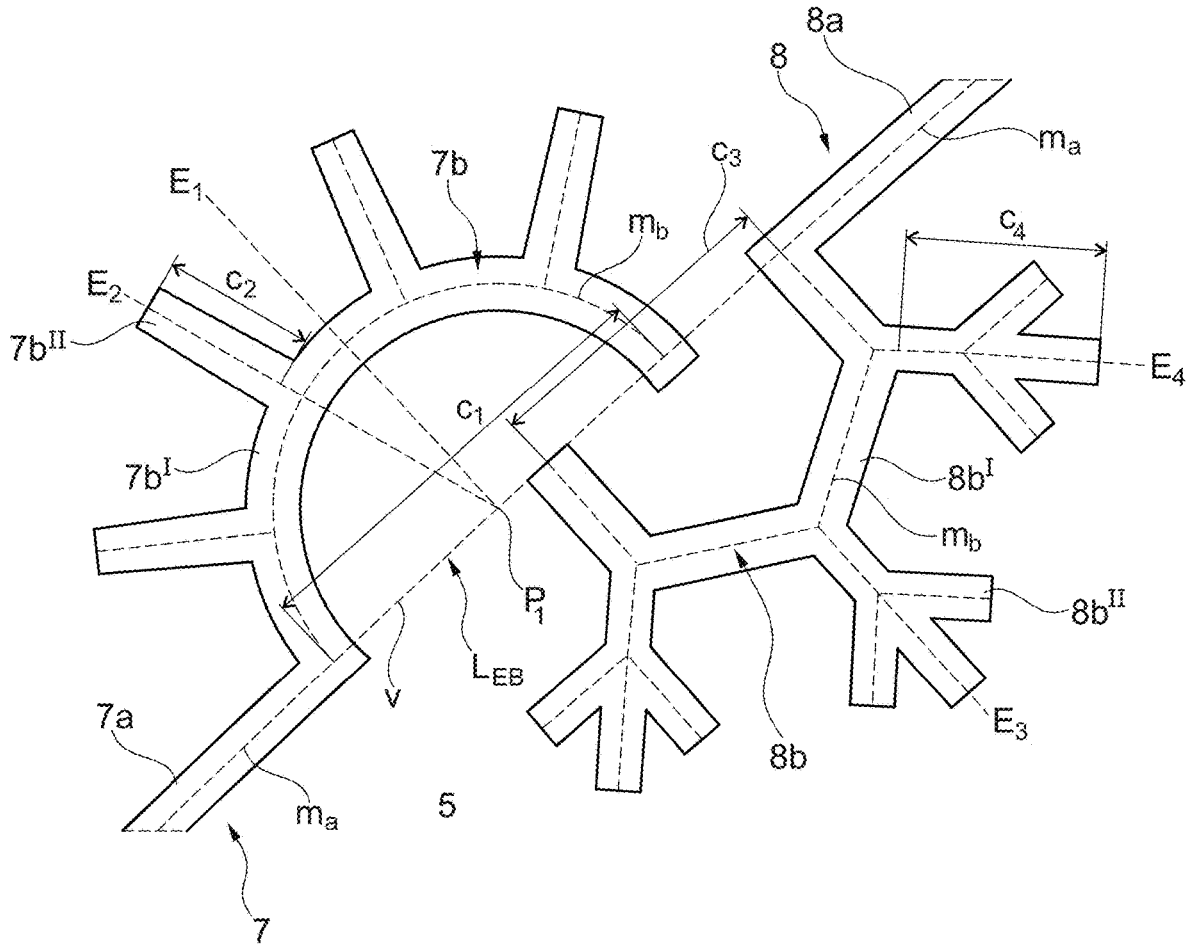
Fig. 3:$Z_3$

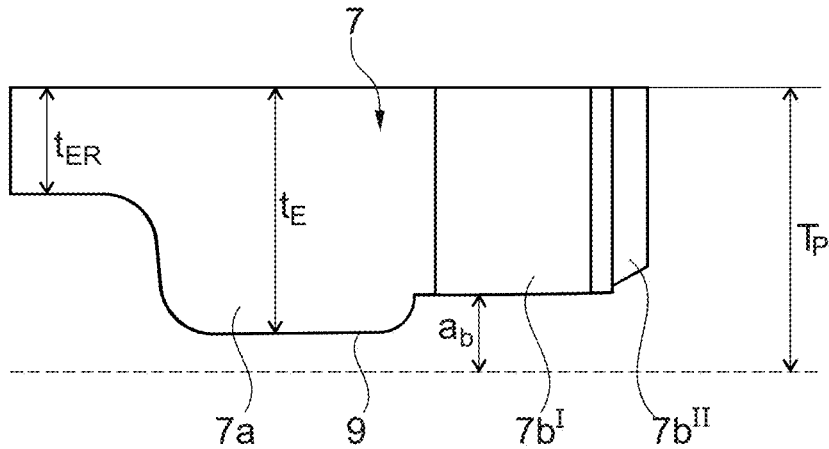
Fig. 5:S$_5$
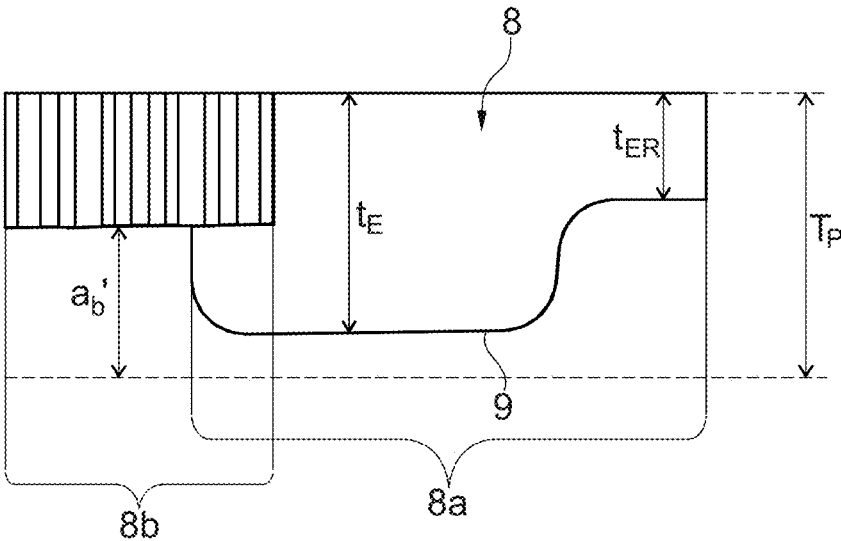
Fig. 6:S$_6$

PNEUMATIC VEHICLE TYRE

CROSS-REFERENCE TO RELATED APPLICATIONS

This application is a National Stage Application under 35 U.S.C. § 371 of International Patent Application No. PCT/DE2023/200030 filed on Feb. 10, 2023, and claims priority from German Patent Application No. 10 2022 203 296.9 filed on Apr. 1, 2022, the disclosures of which are herein incorporated by reference in their entireties.

BRIEF SUMMARY

The invention relates to a pneumatic vehicle tire comprising a tread with profile positives delimited by grooves, including profile positives which are provided with sipes, which in plan view run at least in certain portions at an angle of 0° to 50° to the axial direction and have a width of 0.4 mm to 1.6 mm and a depth at the deepest point that is at least the profile depth reduced by 4.5 mm and at most 100% of the profile depth, with the sipes in each case being involved in forming at least one wear indicator.

Different embodiments of wear indicators formed on treads of pneumatic vehicle tires are known. Conventional wear indicators are formed in particular by profile negatives, for example by sipes or depressions, or by profile positives, preferably by projections formed in grooves. Projections serving as wear indicators locally reduce the groove cross section and may have an adverse effect on the water drainage characteristics. Depressions provided in the form of wear indicators locally reduce the profile stiffness, which can result in an uneven wear pattern and have adverse effects on performance in dry conditions.

A pneumatic vehicle tire of the type mentioned at the outset is known for example from DE 10 2011 054 662 A1. The pneumatic vehicle tire comprises a tread with profile positives each having at least two sipes, the one sipe being involved in forming a wear indicator. The sipe involved in forming the wear indicator has a geometry which is different than the other sipe and is clearly visible to the human eye when a remaining tread depth is reached in plan view. In the exemplary embodiment described, the sipe involved in forming the wear indicator has a radially outer sipe portion, which runs in a wavy shape in certain portions in plan view, and a radially inner sipe portion, with the radially inner sipe portion, after the radially outer sipe portion has worn down, running in a straight line as seen in plan view. The advantage of wear indicators integrated in sipes is in particular that, by comparison with the conventional wear indicators mentioned at the outset, they do not influence the groove cross section and barely affect the local profile stiffness. The already known wear indicators integrated in sipes do not communicate much information to the user. In particular, there is the risk that the wear indicator is not perceived as such at all.

The invention is therefore based on the object of providing, in the case of a pneumatic vehicle tire of the type mentioned at the outset, an easily identifiable and self-explanatory wear indicator, with the intention being to retain the advantages of wear indicators integrated in sipes.

The stated object is achieved according to the invention in that the wear indicator is formed by a sipe portion of the sipe which in plan view has the form of a sun symbol or a snowflake symbol.

The sipe portion having the form of such a symbol forms, even when the tire is new, a readily identifiable wear indicator with a function which is self-explanatory to the viewer. The advantages involved with wear indicators integrated in sipes are also retained.

According to a preferred embodiment, the sipe portion keeps its form down to the sipe base of the sipe. After the sipe portion has worn down, the sipe portion thus disappears completely, as a result of which it is particularly clearly identifiable that a specific state of wear has been reached.

According to a further, preferred embodiment, the sipe portion ends at a radially determined distance before the level of the maximum depth of the sipe. After the sipe portion has worn down, part of the sipe thus expediently remains in the tread profile, and this is advantageous for example for properties in terms of grip on snow.

The sipe portion is preferably at a radially determined distance of 1.6 mm to 4.5 mm from the level of the profile depth. As a result, particularly relevant states of wear are indicated.

According to a further, preferred embodiment, the sipe portion having the form of a sun symbol is at a radially determined distance of 1.6 mm to 2.0 mm, in particular of 1.6 mm or of 2.0 mm, from the level of the profile depth. The sipe portion having the form of a sun symbol acts as "summer wear indicator" in this embodiment. 1.6 mm corresponds to the currently lowest legally prescribed minimum tread depth in EU countries. A correspondingly larger distance ensures a "safety buffer" in this respect.

A further, preferred embodiment is characterized in that the sipe portion having the form of a sun symbol is formed by a first sub-portion, which runs over a circular arc, in particular over a circular arc of a semicircle, and at least three, in particular four, elongate and radially extending second sub-portions proceeding from the outer side of the circular arc of the first sub-portion. Such a sun symbol has a particularly characteristic shape and can thus be contextualized and identified particularly clearly.

In the case of the last-mentioned preferred embodiment, it is advantageous if the second sub-portions are shallower than the first sub-portion, with the sipe base in the region of the second sub-portions extending at an inclination to the radial direction such that each second sub-portion becomes continuously deeper in the direction toward the first sub-portion. As the tread becomes ever more worn, the second sub-portions symbolizing the sunrays become continuously shorter, as a result of which the tread wear can be particularly readily tracked just before a critical range is reached.

According to a further, preferred embodiment, the sipe portion having the form of a snowflake symbol is at a radially determined distance of 3.0 mm to 4.5 mm, in particular of 3.0 mm or of 4.0 mm, from the level of the profile depth. The sipe portion having the form of a snowflake symbol acts as "winter wear indicator" in this embodiment. 3.0 mm or 4.0 mm corresponds to the legally prescribed minimum tread depth for winter tires in some EU countries. A correspondingly larger distance ensures a "safety buffer" in this respect.

In the case of a preferred variant of the last-mentioned preferred embodiment, the sipe portion having the form of a snowflake symbol is formed by at least three, in particular by four, first sub-portions extending along sides of a hexagon, in particular a regular hexagon, and by branched second sub-portions starting at the mutual connection points of the first sub-portions. Such a snowflake symbol has a particularly characteristic shape and can thus be contextualized and identified particularly clearly.

In the case of the last-mentioned preferred variant, it is advantageous if the branched second sub-portions as seen in plan view are each Y-shaped, with the base of the Y being connected to the mutual connection point of two first subportions and the base of the Y preferably continuing between the arms of the Y. This further improves the appearance of the snowflake symbol.

According to a further, preferred embodiment, the sipe portion as seen in plan view has an, in particular exactly one, plane of symmetry. The symmetrical shape of the symbolic sipe portion makes it even more identifiable.

A further preferred embodiment is characterized in that the sipe portion does not emerge into a groove. This ensures that the effects of the sipe on the stiffness of the respective profile positive are made uniform, and this is favorable for example for the wear characteristics.

A preferred variant of the last-mentioned preferred embodiment is that sipes formed in pairs in the same profile positive are provided, with the one sipe comprising the sipe portion having the form of a sun symbol and the other sipe comprising the sipe portion having the form of a snowflake symbol, with the sipes being formed in pairs such that the sipe portions are at least partially situated opposite one another. As a result, a particularly striking sipe combination providing both a "summer wear indicator" and a "winter wear indicator" is formed at one point of the profile. The sun symbol and the snowflake symbol increase—compared to conventional sipes—the overall length, or void volume, of the respective sipe. In this respect, the paired sipes can be construed as one partially interrupted sipe, with this interruption compensating for the greater sipe void volume caused by the symbols, or the greater sipe length caused by the symbols, and this is advantageous for the stiffness of the profile positive, or the stiffness distribution within the profile positive.

In the case of the last-mentioned variant, it is advantageous if the sipes are each composed of the sipe portion having the form of a sun symbol or a snowflake symbol and a further sipe portion, which in particular emerges into a respective groove, with the further sipe portions as seen in plan view preferably running in line with one another. This is advantageous for the stiffness of the profile positive, with primarily the usual segmentation of the profile positive associated with sipes being substantially retained.

BRIEF DESCRIPTION OF THE SEVERAL VIEWS OF THE DRAWINGS

Further features, advantages and details of the invention will now be discussed in more detail with reference to the drawing, which schematically shows an exemplary embodiment of the invention. In the figures:

FIG. 1 shows a simplified plan view of a circumferential portion, developed into the plane, of a tread of a pneumatic vehicle tire having a variant embodiment of the invention, FIG. 2 shows an enlarged plan view of the profile block of the tread located in the detail $Z_2$ in FIG. 1, FIG. 3 shows a greatly enlarged plan view of the detail $Z_3$ in FIG. 1, FIG. 5 shows an enlarged front view of the visualization of the one sipe according to the viewing direction indicated in FIG. 2 by the arrow $S_5$, and FIG. 6 shows an enlarged front view of the visualization of the other sipe according to the viewing direction indicated in FIG. 2 by the arrow $S_6$.

DETAILED DESCRIPTION

Figure 4:
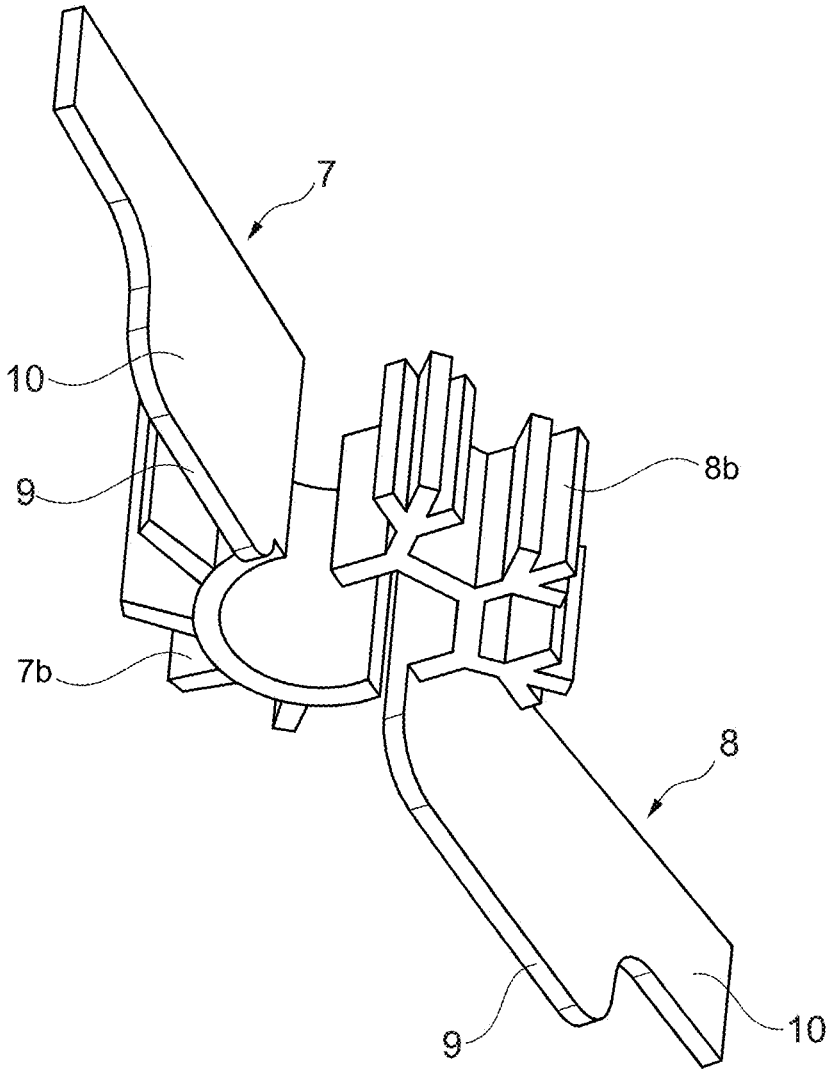
FIG. 4 shows a visualization of two sipes (negative solids of the sipes) formed in the profile block from FIG. 2.

Pneumatic vehicle tires designed according to the invention are tires for motor vehicles, in particular for multi-track motor vehicles, and preferably radial tires for passenger cars, vans or light trucks (small delivery trucks with a permissible gross vehicle weight of ≤3.5 t, light trucks with a permissible gross vehicle weight of ≤7.5 t), with the tires being intended in particular for year-round use or for driving in winter driving conditions.

FIG. 1 shows a plan view of a circumferential portion of a tread of a pneumatic vehicle tire. The tread is directional, with the pneumatic vehicle tire being intended for mounting on the axle of a vehicle such that it has the rolling direction indicated by the arrow R during forward travel. The tire equatorial plane is characterized by a line A-A.

In each half of the tread in plan view, the tread has mutually parallel oblique grooves 1, which extend from the region of the tire equatorial plane to the edges of the tread, run in a V shape overall over the width of the tread, are formed at least over most of their extent to the respective provided profile depth $T_P$ (indicated in FIG. 5 and FIG. 6) of in particular 6.0 mm to 9.5 mm and thus are the main (drainage) grooves of the tread, with the oblique grooves 1 that extend in different halves of the tread being circumferentially offset relative to one another. In the case of treads with main (drainage) grooves of different depths, the expression "profile depth" refers to the depth of the deepest main (drainage) groove(s). A sipe-like groove 2, which emerges into the respective oblique groove 1 extending in the other half of the tread, is connected to that end of each oblique groove 1 that is to the inside of the tread. Two short grooves 3, which are inclined circumferentially in the opposite direction to the oblique grooves 1 and are each provided with a sipe (not designated) proceeding from its groove base, also extend in each half of the tread between circumferentially adjacent oblique grooves 1.

The oblique grooves 1 and the short grooves 3 subdivide the tread into central profile blocks 4, semi-central profile blocks 5, and shoulder-side profile blocks 6 that are part of the shoulder-side rows of profile blocks. The oblique grooves 1 extend in the region of the central profile blocks 4 and the semi-central profile blocks 5 in plan view at an angle of up to 50° to the axial direction and in the region of the shoulder-side profile blocks 6 at an angle of 0° to 20° to the axial direction.

Each profile block 4, 5, 6 has, on the periphery of the tread, a block outer face 4c (profile block 4), 5c (profile block 5), 6c (profile block 6), a leading block edge 4a (profile block 4), 5a (profile block 5), 6a (profile block 6) formed at the one adjoining oblique groove 1, and a trailing block edge 4b (profile block 4), 5b (profile block 5), 6b (profile block 6) formed at the other adjoining oblique groove 1, and when the tire is rolling during forward travel (arrow R), the leading block edge 4a, 5a, 6a enters the contact patch before the trailing block edge 4b, 5b, 6b do.

A respective semi-central profile block 5 having two sipes 7, 8, which are closed at one end and proceed from the associated block outer face 5c, is provided in each half of the tread in the circumferential portion shown. With preference, multiple semi-central profile blocks 5 having sipes 7, 8 are provided in each half of the tread.

The further configuration of the sipes 7, 8 is explained below with reference to individual sipes 7, 8 formed in a semi-central profile block 5.

FIG. 2 shows a plan view of a semi-central profile block 5 and also the short grooves 3 adjoining it and the portions of the oblique grooves 1 adjoining it. The sipe 7 emerges into the short groove 3 delimiting the semi-central profile block 5 to the inside of the tread, has a closed end in the semi-central profile block 5, and is inclined with respect to the axial direction correspondingly to the block edges $5a$, $5b$. The sipe $8$ emerges into the short groove $3$ delimiting the semi-central profile block $5$ to the outside of the tread, has a closed end in the semi-central profile block $5$, and is inclined with respect to the axial direction correspondingly to the block edges $5a$, $5b$.

As seen in plan view, the sipes $7$, $8$ are composed of a peripheral sipe portion $7a$, $8a$ emerging into the respective short groove $3$ and a symbolic internal sipe portion $7b$, $8b$ that forms a wear indicator, with the internal sipe portion $7b$ being partially situated opposite the internal sipe portion $8b$. Each sipe $7$, $8$ is delimited by a sipe base $9$ (FIG. $4$) and two in particular radially extending sipe walls $10$ (FIG. $4$) and has a width be of 0.4 mm to 1.6 mm, in particular of up to 1.2 mm, particularly preferably of up to 0.8 mm, and radially has a maximum depth $t_E$ (depth at the deepest point; FIG. $5$: sipe $7$; FIG. $6$: sipe $8$) of up to 100% of the profile depth $T_P$ (FIG. $5$, FIG. $6$), with the maximum depth $t_E$ preferably being the profile depth $T_P$ reduced by 0.75 mm to 1.5 mm.

The peripheral sipe portions $7a$, $8a$ extend, as seen in plan view, with a barely perceptible arc shape, at an inclination circumferentially in the same direction to the oblique grooves $1$, in each case at an angle $\alpha$ of 40° to 50° to the axial direction and in line with one another, such that they define a common sipe baseline $L_{EB}$, and have, also as seen in plan view, a respective centerline $m_a$ that follows their course, and the two centerlines $m_a$, together with a connecting line v which runs in a straight line between the mutually facing ends of the centerlines $m_a$, forming the sipe baseline $L_{EB}$. The peripheral sipe portions $7a$, $8a$ are at a distance $a_v$ from one another, measured along the connecting line v, and are configured radially at least over part of their extent, in particular most of their extent, down to the cited maximum depth $t_E$ (FIG. $5$: sipe portion $7a$; FIG. $6$: sipe portion $8a$). The angle $\alpha$ relates to a tangent (not shown) placed at the respective point of the corresponding centerline $m_a$, and the width $b_E$ is determined perpendicularly to the respective tangent.

As shown in FIG. $5$ and FIG. $6$, in the exemplary embodiment shown the peripheral sipe portions $7a$, $8a$ each extend over a radially raised peripheral region (not designated) which emerges into the respective short groove $3$ (cf. FIG. $2$) and has a radially determined depth $t_{ER}$ of 30% to 70% of the maximum depth $t_E$.

According to FIG. $3$, the internal sipe portions $7b$, $8b$, as seen in plan view, have multiple branches, with the internal sipe portion $7b$ being in the form of a sun symbol and the internal sipe portion $8b$ being in the form of a snowflake symbol. The internal sipe portions $7b$, $8b$ extend radially into the semi-central profile block $5$, keeping their symbolic form (FIG. $4$).

The internal sipe portion $7b$ has, as seen in plan view, a plane of symmetry $E_1$ extending perpendicularly to the sipe baseline $L_{EB}$ and radially, is composed, also as seen in plan view, of a sub-portion $7b^I$, which runs over a circular arc of a semicircle, and four elongate, radially extending and straight sub-portions $7b^{II}$, which are distributed uniformly over the sub-portion $7b^I$ and proceed from the outer side of the circular arc of the sub-portion $7b^I$, and has a correspondingly branched, partially curved and partially straight centerline $m_b$.

The sub-portion $7b^I$ extends from the peripheral sipe portion $7a$ in the direction toward the trailing block edge $5b$ (FIG. $2$) and back again to the sipe baseline $L_{EB}$, with the circle center point $P_1$ on which the sub-portion $7b^I$ is based preferably being situated on the connecting line v and with the sub-portion $7b^I$ having a length $c_1$, which corresponds to the diameter of the semicircle and is thus measured along the connecting line v, based on the centerline $m_b$ of 3.0 mm to 5.0 mm. According to FIG. $5$, the sub-portion $7b^I$ ends radially before the level of the maximum depth $t_E$ and—measured from the sipe base $9$—is at a radial distance $a_b$ from the level of the profile depth $T_P$ of 1.6 mm to 2.0 mm, in particular of 1.6 mm (1.6 mm corresponds to the currently lowest legally prescribed minimum tread depth in EU countries).

As FIG. $3$ also shows, the sub-portions $7b^{II}$, as seen in plan view, are elongatedly rectangular or elongatedly trapezoidal. The sub-portions $7b^{II}$ each have a radially and longitudinally extending plane of symmetry $E_2$, with the planes of symmetry $E_2$ of all the sub-portions $7b^{II}$ coinciding with the plane of symmetry $E_1$ at the circle center point $P_1$, and also have a respective length $c_2$, determined along the associated plane of symmetry $E_2$, of 2.0 mm to 3.0 mm. According to FIG. $5$, each sub-portion $7b^{II}$ is radially shallower than the sub-portion $7b^I$, with the sipe base $9$ in the region of the sub-portions $7b^{II}$ extending at an inclination to the radial direction such that each sub-portion $7b^{II}$ becomes continuously deeper in the direction toward the sub-portion $7b^I$.

As FIG. $3$ also shows, the internal sipe portion $8b$, as seen in plan view, has a plane of symmetry $E_3$ extending perpendicularly to the sipe baseline $L_{EB}$ and radially, is composed, also as seen in plan view, of four sub-portions $8b^I$, which run along four sides of a hexagon, in particular a regular hexagon, and three branched sub-portions $8b^{II}$ connected to the outer side of the hexagon, in each case to a corner region of the hexagon, and has a correspondingly branched centerline $m_b$. The sub-portion $8b^I$ extends from the peripheral sipe portion $8a$ in the direction toward the leading block edge $5a$ (FIG. $2$) and back again to the sipe baseline $L_{EB}$ and has a length $c_3$, measured along the connecting line v, based on the centerline $m_b$ of 3.0 mm to 5.0 mm.

The sub-portions $8b^{II}$ are each Y-shaped as seen in plan view, with the base of the Y being continued between the arms of the Y, and have a respective radially extending plane of symmetry $E_4$ and a length $c_4$, determined along the plane of symmetry $E_4$, of 2.0 mm to 3.0 mm.

According to FIG. $6$, the internal sipe portion $8b$—measured from the sipe base $9$—is at a radial distance $a_b'$ from the level of the profile depth $T_P$ of 3.0 mm to 4.5 mm, in particular of 3.0 mm or of 4.0 mm (3.0 mm or 4.0 mm corresponds to the legally prescribed minimum tread depth for winter tires in some EU countries).

As shown in FIG. $3$, the sipes $7$, $8$ are also configured such that the free end of the sub-portion $7b^I$, $8b^I$ lies in each case in the region between the two ends of the respective other sub-portion $7b^I$, $8b^I$.

The invention is not limited to the exemplary embodiment described.

The sipes may also be formed in profile ribs that run around the circumference and may pass through the respective profile positive (profile rib, profile block). The sipes each have at least one sipe portion which serves as wear indicator and is symbolic in plan view. The one or more sipe portions that is or are not symbolic may, as seen in plan view, extend in particular in a straight line, in an arc shape, in a wavy shape, and also in a curved and wavy shape. Sipes having multiple sipe portions, in particular having two sipe portions serving as wear indicators, may also be provided. The maximum depth of the sipes is at least the profile depth reduced by 4.5 mm. The tread does not need to be directional.

LIST OF REFERENCE SIGNS

1 . . . Oblique groove
2 . . . Groove
3 . . . Short groove
4 . . . Central profile block
4a . . . Leading block edge
4b . . . Trailing block edge
4c . . . Block outer face
5 . . . Semi-central profile block
5a . . . Leading block edge
5b . . . Trailing block edge
5c . . . Block outer face
6 . . . Shoulder-side profile block
6a . . . Leading block edge
6b . . . Trailing block edge
6c . . . Block outer face
7 . . . Sipe
7a . . . Peripheral sipe portion
7b . . . Internal sipe portion
$7b^I$, $7b^{II}$ . . . Sub-portion
8 . . . Sipe
8a . . . Peripheral sipe portion
8b . . . Internal sipe portion
$8b^I$, $8b^{II}$ . . . Sub-portion
9 . . . Sipe base
10 . . . Sipe wall
A-A . . . Line (tire equatorial plane)
$a_b$, $a_b'$, $a_v$ . . . Distance
$b_E$ . . . Width
$c_1$, $c_2$, $c_3$, $c_4$ . . . Length
$E_1$, $E_2$, $E_3$, $E_4$ . . . Plane of symmetry
$L_{EB}$ . . . Sipe baseline
$m_a$, $m_b$ . . . Centerline
$P_1$ . . . Circle center point
R . . . Arrow (rolling direction)
$S_5$, $S_6$ . . . Arrow (viewing direction)
$t_E$ . . . Maximum depth
$t_{ER}$ . . . Depth
$T_P$ . . . Profile depth
V . . . Connecting line
$Z_2$, $Z_3$ . . . Detail
$\alpha$ . . . Angle

The invention claimed is:

1. A pneumatic vehicle tire comprising:
a tread with a profile depth and profile positives delimited by grooves;

a semi-central profile block of the tread;
a first sipe and a second sipe, which in plan view run at an angle of 0° to 50° to the axial direction and has a width of 0.4 mm to 1.6 mm and a depth at the deepest point that is at least the profile depth reduced by 4.5 mm and at most 100% of a profile depth;
a sun shaped symbol of the first sipe and having a profile depth less than a sipe base;
a snowflake shaped symbol of the second sipe having a profile depth less than the profile depth of the sun shaped symbol;
a wear indicator formed by the first sipe and the second sipe, the wear indicator having a first symbol, a second symbol and a non-symbol portion and indicating a first state of wear;
the first symbol has a first profile depth less than a profile depth of the non-symbol portion and indicating a critical state of wear; and
a symbolic wear indicator formed in a profile rib that runs around a circumference of the tire.

2. A pneumatic vehicle tire comprising:
a tread with a profile depth and profile positives delimited by grooves;
a semi-central profile block;
a first sipe and a second sipe, which in plan view run at an angle of 0° to 50° to the axial direction and has a width of 0.4 mm to 1.6 mm and a depth at the deepest point that is at least the profile depth reduced by 4.5 mm and at most 100% of a profile depth;
a wear indicator formed by the first sipe and the second sipe, the wear indicator having a first symbol, a second symbol and a non-symbol portion;
the first symbol has a first profile depth less than a profile depth of the non-symbol portion; and
the second symbol has a second profile depth less than the first profile depth.

3. The tire of claim 2, wherein the first symbol is part of the first sipe and the second symbol is part of the second sipe and a portion of the first symbol overlaps a portion of the second symbol in a circumferential direction.

4. The tire of claim 2, wherein the wear indicator is located between first and second oblique drainage grooves and first and second short grooves.

5. The tire of claim 2, wherein the first sipe and the second sipe are delimited by a sipe base having 100 percent of the profile depth.

* * * * *